United States Patent
Ollila et al.

(10) Patent No.: US 10,488,917 B2
(45) Date of Patent: Nov. 26, 2019

(54) GAZE-TRACKING SYSTEM AND METHOD OF TRACKING USER'S GAZE USING REFLECTIVE ELEMENT

(71) Applicant: Varjo Technologies Oy, Helsinki (FI)

(72) Inventors: Mikko Ollila, Tampere (FI); Urho Konttori, Helsinki (FI); Klaus Melakari, Oulu (FI); Oiva Arvo Oskari Sahlsten, Salo (FI)

(73) Assignee: VARJO TECHNOLOGIES OY, Helsinki (FI)

( * ) Notice: Subject to any disclaimer, the term of this patent is extended or adjusted under 35 U.S.C. 154(b) by 0 days.

(21) Appl. No.: 15/898,441

(22) Filed: Feb. 17, 2018

(65) Prior Publication Data

US 2019/0258314 A1  Aug. 22, 2019

(51) Int. Cl.
*G06F 3/01* (2006.01)
*G02B 27/09* (2006.01)
*G02B 27/01* (2006.01)

(52) U.S. Cl.
CPC ......... *G06F 3/012* (2013.01); *G02B 27/0172* (2013.01); *G02B 27/0977* (2013.01)

(58) Field of Classification Search
None
See application file for complete search history.

(56) References Cited

U.S. PATENT DOCUMENTS

| | | | |
|---|---|---|---|
| 2015/0279102 A1* | 10/2015 | Fleck | G06T 19/006 345/419 |
| 2017/0140223 A1* | 5/2017 | Wilson | G02B 27/0093 |
| 2018/0239423 A1* | 8/2018 | Mardanbegi | A61B 3/113 |

* cited by examiner

*Primary Examiner* — Kenneth B Lee, Jr.
(74) *Attorney, Agent, or Firm* — Ziegler IP Law Group, LLC

(57) ABSTRACT

A gaze-tracking system for use in a head-mounted display apparatus. The gaze-tracking system includes at least one illuminator to emit light pulses for illuminating a user's eye; at least one camera to capture image of reflections of the light pulses; at least one reflective element arranged on an optical path of the reflections of the light pulses, such that when incident upon the at least one reflective element, the reflections of the light pulses are reflected towards the at least one camera; at least one actuator associated with the at least one reflective element, wherein the at least one actuator moves the at least one reflective element; and a processor configured to: process the at least one image to detect a gaze direction of user; and control the at least one actuator to adjust, based upon the detected gaze direction, position of the at least one reflective element.

20 Claims, 7 Drawing Sheets

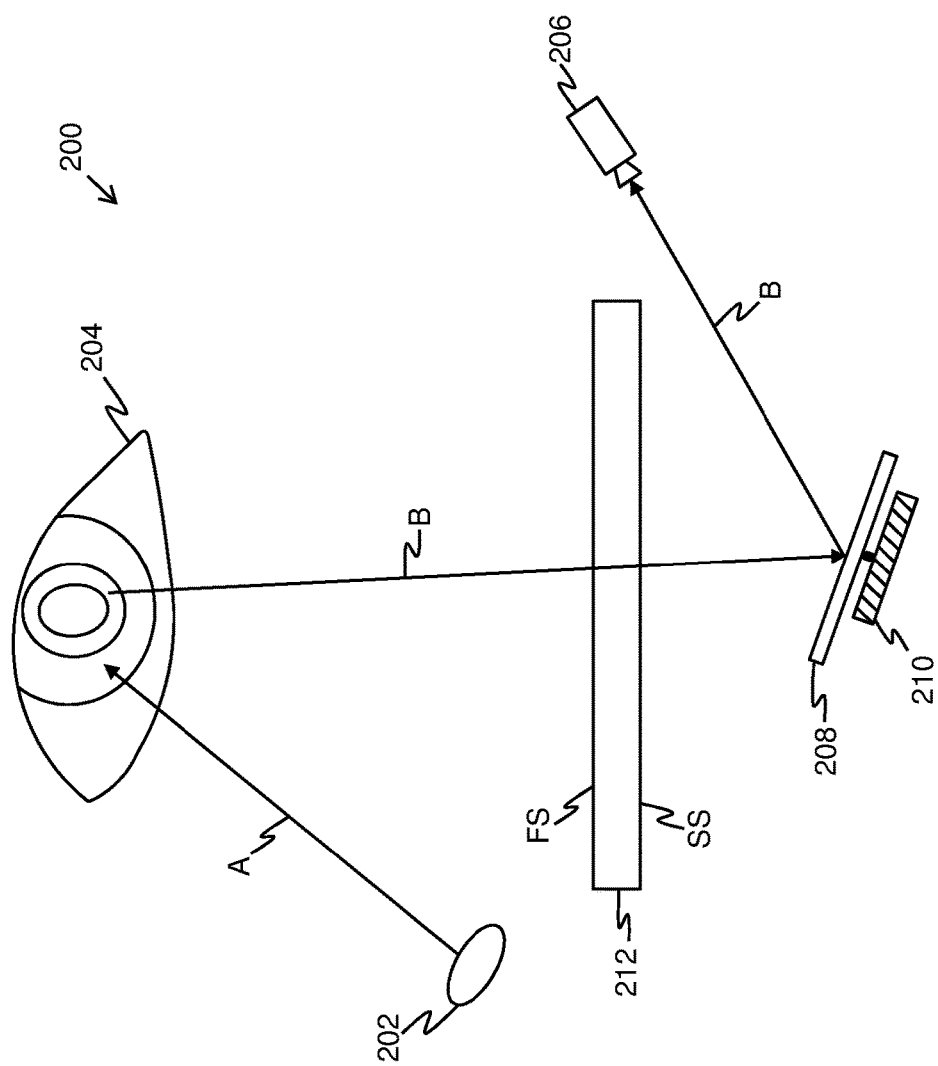

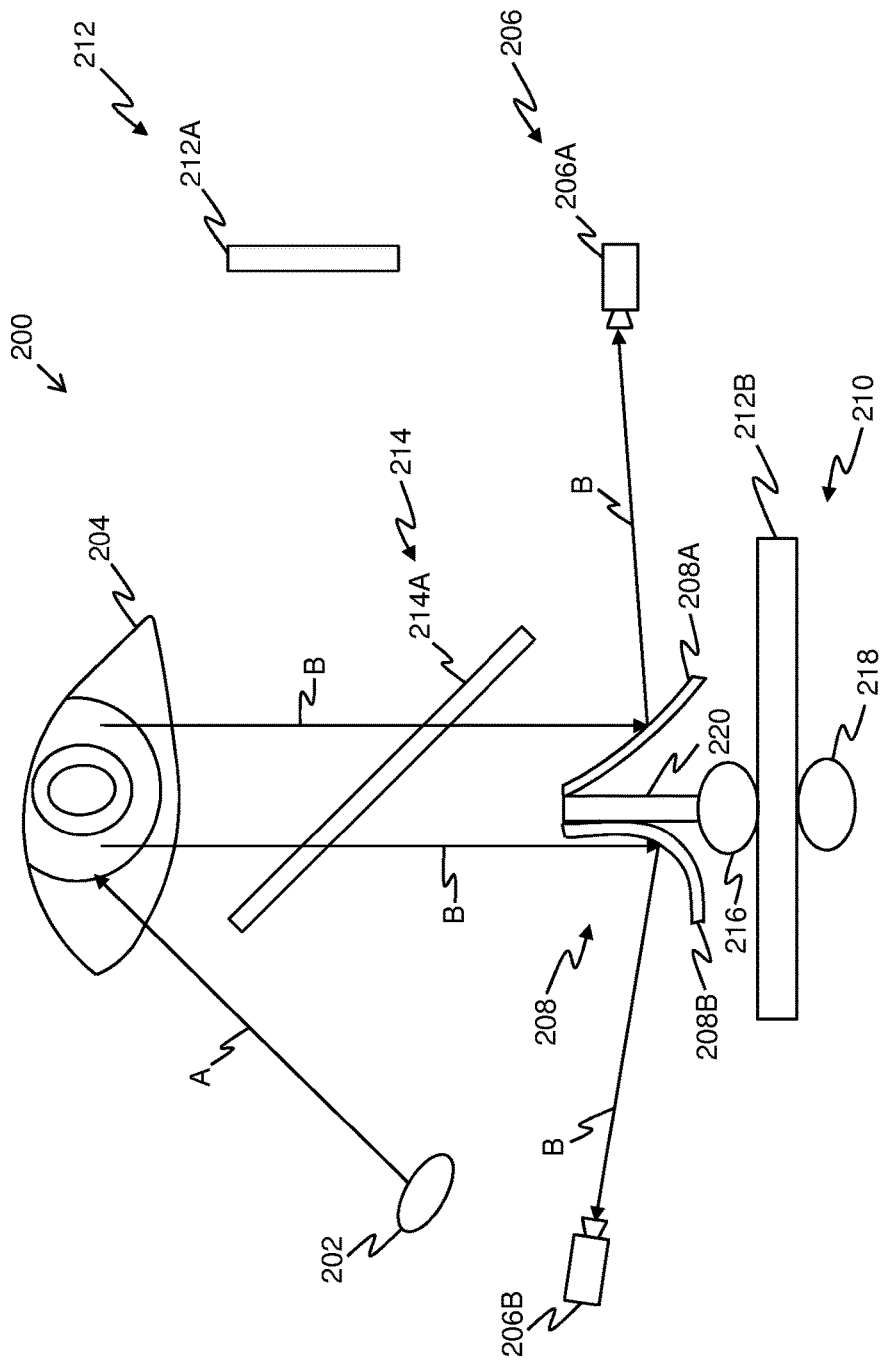

GAZE-TRACKING SYSTEM AND METHOD OF TRACKING USER'S GAZE USING REFLECTIVE ELEMENT

TECHNICAL FIELD

The present disclosure relates generally to display apparatuses; and more specifically, to gaze-tracking systems for use in head-mounted display apparatuses, such gaze-tracking systems comprising illuminators, cameras, reflective elements, actuators and processors. Furthermore, the present disclosure also relates to methods of tracking a user's gaze via the aforementioned gaze-tracking systems.

BACKGROUND

In recent times, there has been a rapid increase in use of technologies such as virtual reality, augmented reality, and so forth, for presenting a simulated environment (or a virtual world) to a user. Typically, the user uses a specialized device (for example, such as a virtual reality device, an augmented reality device, and the like) for experiencing such a simulated environment. In use, the user generally wears (namely, supports) the specialized device on his/her head.

Nowadays, such specialized devices often employ a technique such as gaze-tracking (namely, eye tracking) to determine a gaze direction of the user. Typically, the gaze-tracking is associated with determination of position of pupils of eyes of the user. Generally, an illumination source is employed for emitting light towards the user's eyes, and a camera is employed for capturing an image depicting reflection(s) of emitted light from the user's eyes. Furthermore, the reflection(s) emitted light from the user's eyes is used as a frame of reference for determining the position of the pupils of the user's eyes with respect thereto.

However, there exist a number of limitations associated with implementation of the aforementioned gaze-tracking techniques. Firstly, the camera is limited in its ability to fully focus a convex object such as the user's eye. As a result, there may exist blurriness associated with certain regions of the user's eye, within the captured image. Consequently, such blurriness severely limits accuracy of the determined gaze direction of the user. Secondly, a position of the camera is generally changed by employing an actuator, to accurately capture the reflection(s) of the emitted light from the user's eyes. In such a case, a magnitude and/or a direction of movement of the camera, is required to be precise. However, due to limited size of the head mounted display apparatus, moving the camera in a desired direction may be cumbersome. Furthermore, arranging the actuator in connection with the camera increases complexity associated with physical design of the aforesaid specialized devices. Consequently, there exists several optical design constraints associated with the specialized device for implementing such gaze-tracking techniques. Thirdly, the captured image of the reflection(s) of the emitted light from the user's eyes often depicts a side perspective view of the user's eye. Such a side perspective image can also lead to inaccuracies in determining the gaze direction of the user.

Therefore, in light of the foregoing discussion, there exists a need to overcome the aforementioned drawbacks associated with conventional equipment and techniques for gaze-tracking.

SUMMARY

The present disclosure seeks to provide a gaze-tracking system for use in a head-mounted display apparatus.

The present disclosure also seeks to provide a method of tracking a user's gaze, via a gaze-tracking system of a head-mounted display apparatus.

The present disclosure seeks to provide a solution to the existing problem of inaccuracies in existing gaze-tracking techniques due to sub-optimal imaging of reflection(s) of emitted light from the user's eyes. An aim of the present disclosure is to provide a solution that overcomes at least partially the problems encountered in the prior art, and provides a robust and efficient gaze-tracking system that eliminates inaccuracies associated with use of existing gaze-tracking techniques.

In one aspect, an embodiment of the present disclosure provides a gaze-tracking system for use in a head-mounted display apparatus, the gaze-tracking system comprising:
  at least one illuminator, the at least one illuminator being operable to emit light pulses, wherein the light pulses are to be used to illuminate a user's eye when the head-mounted display apparatus is worn by the user;
  at least one camera, the at least one camera being operable to capture at least one image of reflections of the light pulses from the user's eye;
  at least one reflective element, wherein the at least one reflective element is to be arranged on an optical path of the reflections of the light pulses, such that when incident upon the at least one reflective element, the reflections of the light pulses are reflected towards the at least one camera;
  at least one actuator associated with the at least one reflective element, wherein the at least one actuator is to be employed to move the at least one reflective element; and
  a processor coupled in communication with the at least one illuminator, the at least one camera and the at least one actuator, the processor being configured to:
    (i) process the at least one image to detect a gaze direction of the user; and
    (ii) control the at least one actuator to adjust, based upon the detected gaze direction of the user, a position of the at least one reflective element.

In another aspect, an embodiment of the present disclosure provides a method of tracking a user's gaze, via a gaze-tracking system of a head-mounted display apparatus, the gaze-tracking system comprising at least one illuminator, at least one camera, at least one reflective element and at least one actuator associated with the at least one reflective element, the method comprising:
  (i) emitting light pulses, via the at least one illuminator, the light pulses being used to illuminate a user's eye when the head-mounted display apparatus is worn by the user;
  (ii) capturing, via the at least one camera, at least one image of reflections of the light pulses from the user's eyes, wherein the at least one reflective element is arranged on an optical path of the reflections of the light pulses, such that when incident upon the at least one reflective element, the reflections of the light pulses are reflected towards the at least one camera;
  (iii) processing the at least one image to detect a gaze direction of the user; and
  (iv) controlling the at least one actuator to adjust, based upon the detected gaze direction of the user, a position of the at least one reflective element.

Embodiments of the present disclosure substantially eliminate or at least partially addresses the aforementioned problems in the prior art, and enables enable accurate and efficient tracking of the user's gaze.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 2A-2E illustrate exemplary implementations of a gaze-tracking system in use within a head-mounted display apparatus, in accordance with various embodiments of the present disclosure.

Figure 1:
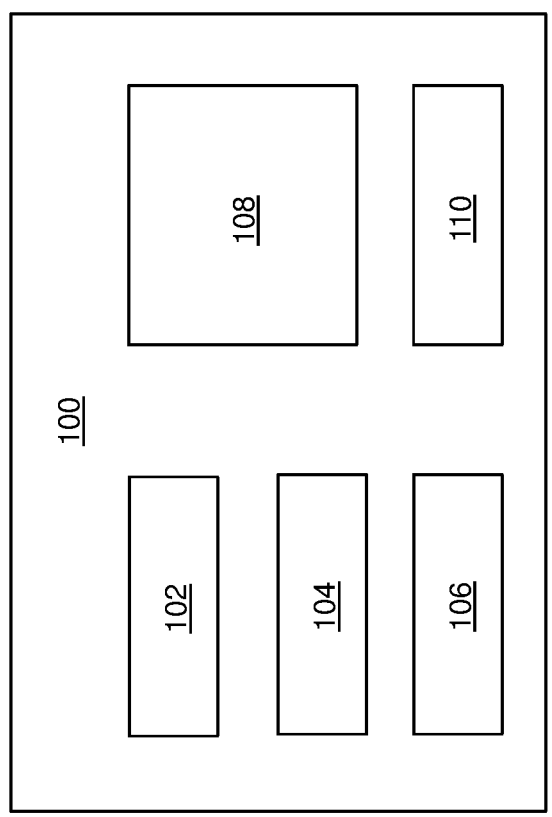
FIG. 1 illustrates a block diagram of a gaze-tracking system for use in a head-mounted display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a gaze-tracking system for use in a head-mounted display apparatus, the gaze-tracking system comprising:

at least one illuminator, the at least one illuminator being operable to emit light pulses, wherein the light pulses are to be used to illuminate a user's eye when the head-mounted display apparatus is worn by the user;

at least one camera, the at least one camera being operable to capture at least one image of reflections of the light pulses from the user's eye;

at least one reflective element, wherein the at least one reflective element is to be arranged on an optical path of the reflections of the light pulses, such that when incident upon the at least one reflective element, the reflections of the light pulses are reflected towards the at least one camera;

at least one actuator associated with the at least one reflective element, wherein the at least one actuator is to be employed to move the at least one reflective element; and a processor coupled in communication with the at least one illuminator, the at least one camera and the at least one actuator, the processor being configured to:
(i) process the at least one image to detect a gaze direction of the user; and
(ii) control the at least one actuator to adjust, based upon the detected gaze direction of the user, a position of the at least one reflective element.

In another aspect, an embodiment of the present disclosure provides a method of tracking a user's gaze, via a gaze-tracking system of a head-mounted display apparatus, the gaze-tracking system comprising at least one illuminator, at least one camera, at least one reflective element and at least one actuator associated with the at least one reflective element, the method comprising:
(i) emitting light pulses, via the at least one illuminator, the light pulses being used to illuminate a user's eye when the head-mounted display apparatus is worn by the user;
(ii) capturing, via the at least one camera, at least one image of reflections of the light pulses from the user's eyes, wherein the at least one reflective element is arranged on an optical path of the reflections of the light pulses, such that when incident upon the at least one reflective element, the reflections of the light pulses are reflected towards the at least one camera;
(iii) processing the at least one image to detect a gaze direction of the user; and
(iv) controlling the at least one actuator to adjust, based upon the detected gaze direction of the user, a position of the at least one reflective element.

The present disclosure provides the aforementioned gaze-tracking system and the aforementioned method of tracking a user's gaze, via such a gaze-tracking system. The aforementioned gaze-tracking system accurately focuses a convex object such as the user's eye, thereby, minimizing blurriness in the captured at least one image of reflections of light pulses from the user's eye. Furthermore, the described gaze-tracking system employs adjustment of a position of the at least one reflective element, to allow for continuous capturing of reflections of light pulses from the user's eye, even in an event of a change in the gaze direction of the user. In this regard, the at least one actuator of the gaze-tracking system allows for an easy adjustment of the at least one reflective element. Beneficially, a measure of movement of the at least one actuator (that is associated with movement of the at least one reflective element) enhances an accuracy of the detected gaze direction of the use. Moreover, the described gaze-tracking system allows for reducing complexity associated with physical design of the aforesaid head-mounted display apparatuses. Furthermore, the aforementioned gaze-tracking system beneficially allows for capturing the front view of the user's eye, thereby, enhancing an accuracy of the detected gaze direction of the user's eye.

Throughout the present disclosure, the term "head-mounted display apparatus" used herein relates to specialized equipment that is configured to display a visual scene to the user thereof when the head-mounted display apparatus is worn by the user on his/her head. In such an instance, the head-mounted display apparatus is operable to act as a device (for example, such as a virtual reality headset, an augmented reality headset, a pair of virtual reality glasses, a pair of and augmented reality glasses, and so forth) for presenting the visual scene to the user.

Throughout the present disclosure, the term "gaze-tracking system" used herein relates to specialized equipment for detecting a direction of gaze (namely, the gaze direction) of the user. The head-mounted display apparatus uses the gaze-tracking system for determining the aforesaid gaze direction via non-invasive techniques. Beneficially, an accurate detection of the gaze direction facilitates the head-mounted display apparatus to closely implement gaze contingency thereon. As an example, the gaze-tracking system may be employed to detect the gaze direction of the user's eye for projecting (i) a region of a visual scene whereat the user's gaze is focused, on and around the fovea of the user's eye, and (ii) a remaining region of the visual scene on the retina of the user's eye, of which the fovea is just a small part. Therefore, even upon a change in the gaze direction (namely, due to a movement of the user's eye), active foveation is implemented within the head-mounted display apparatus.

It is to be understood that the gaze-tracking system may also be referred to as an "eye-tracker system", a "means for detecting a gaze direction", a "means for tracking a gaze direction", or a "gaze-tracking unit".

Throughout the present disclosure, the term "at least one illuminator" used herein relates to at least one light source configured to emit the light pulses for illuminating the user's eye. The at least one illuminator is employed to emit the light pulses to illuminate the user's eye when the head-mounted display apparatus is worn by the user. Optionally, the at least one illuminator could emit the light pulses periodically or intermittently. Optionally, in such a case, the at least one illuminator emits the light pulses in a manner that a time duration between emission of two successive light pulses (namely, a duration in which the light pulses are not emitted) is less than a time taken for a shortest possible movement of the user's eyes. In an example, the at least one illuminator may emit the light pulses for a time duration within a range of 2-10 milliseconds. Furthermore, in such an example, there may be saccadic movements associated with the user's eyes, wherein such saccadic movements last for about 20 milliseconds. In such a case, the time duration in which the light pulses are not emitted may lie within a range of 0.5 to 2 milliseconds.

Alternatively, optionally, the at least one illuminator emits light continuously. It will be appreciated that the light pulses emitted by the at least one illuminator are reflected from an outer surface (for example, such as the cornea) of the user's eye, thereby constituting corneal reflections (namely, glints) in the user's eye.

Optionally, the light pulses emitted by the at least one illuminator have an infrared wavelength or a near-infrared wavelength. The light pulses of infrared or near-infrared wavelength are invisible to the human eye, thereby, reducing unwanted distraction when such light pulses are incident upon the user's eye. Alternatively, optionally, the light pulses emitted by the at least one illuminator have a visible wavelength.

Optionally, the at least one illuminator is implemented by way of at least one of: infrared light-emitting diodes, infrared lasers, infrared light projectors, infrared light-emitting diode based displays, visible light-emitting diodes, visible light lasers, visible light projectors.

Optionally, the at least one illuminator emits the light pulses in a direction that is substantially along a view direction of the user's eye.

Alternatively, optionally, the at least one illuminator emits the light pulses in a direction that is at a predefined angle to a view direction of the user's eye. Optionally, in this regard, the gaze-tracking system further comprises at least one substantially-reflective optical element for reflecting the light emitted by the at least one illuminator towards the user's eye. In such a case, the at least one substantially-reflective optical element is positioned on an optical path of the emitted light pulses, namely between the at least one illuminator and the user's eye. As an example, the light pulses can be emitted by the at least one illuminator in a direction that is substantially perpendicular to a view direction of the user's eye. In such an example, the at least one substantially-reflective optical element could be arranged in a manner that it reflects the emitted light pulses towards the user's eye. Optionally, the at least one substantially-reflective optical element is implemented by way of at least one of: a semi-transparent mirror, a fully reflective mirror, a semi-transparent reflector, a prism, a polarizer.

More optionally, the predefined angle may be selected so as to reduce a size of the gaze-tracking system. In an embodiment, the predefined angle ranges from 120 degrees to 240 degrees. In such an instance, the predefined angle may be, for example, such as 120, 130, 140, 150, 160, 170, 180, 190, 200, 210, 220, 230, or 240 degrees with respect to a view direction of the user's eye. In another embodiment, the predefined angle is lesser than 120 degrees (for example, such as 90, 95, 100, 105, 110, or 115 degrees) or greater than 240 degrees (for example, such as 245, 250, 255, 260, 265, or 270 degrees) with respect to the view direction of the user's eye.

In an embodiment, the at least one illuminator is operable to illuminate one eye of the user. Optionally, in such a case, the at least one illuminator comprises at least two illuminators, wherein at least one illuminator is employed per eye of the user. In another embodiment, the at least one illuminator is operable to illuminate both eyes of the user.

Optionally, an intensity of the light pulses emitted by the at least one illuminator is adjustable. Optionally, in this regard, the processor is configured to control the at least one illuminator to adjust the intensity of light pulses emitted thereby.

In operation, the at least one camera captures the at least one image of reflections of the light pulses from the user's eye. The at least one image is representative of a position of the reflections of the light pulses on an image plane of the at least one camera. Notably, the at least one image depicts positions and/or arrangement (namely, intergeometry) of reflections of the light pulses. In other words, the at least one image depicts the positions and/or arrangement of the glints in the user's eye. Furthermore, optionally, the at least one image depicts a form (namely, a pattern) of the reflections of the light pulses. It will be appreciated that the term "image plane of the at least one camera" generally relates to a region of the at least one camera whereat the reflections of the light pulses are focused, to create the aforesaid image. In other words, the image plane of the at least one camera is an imaging surface of the at least one camera, and lies within the at least one camera. Optionally, the image plane of the at least one camera is implemented by way of at least one chip comprising a plurality of photo-sensitive elements implemented thereon. In an embodiment, the image plane of the at least one camera has a substantially-flat shape. In another embodiment, the image plane of the at least one camera has a substantially-curved shape.

Optionally, the at least one camera has a focusable camera lens, and the processor is configured to adjust a focal length of the focusable camera lens based upon the position of the at least one reflective element with respect to the at least one camera. The focusable camera lens is configured to focus the reflections of the light pulses onto the image plane of the at least one camera. Optionally, the focusable camera lens is implemented as a lens subsystem comprising at least one optical component. Examples of the at least one optical component include, but are not limited to, a convex lens, a concave lens, a plano-convex lens, a plano-concave lens, a Liquid Crystal (LC) lens, and a liquid lens.

Optionally, the focusable camera lens is non-detachably integrated within (namely, fixed within) the at least one camera. Alternatively, optionally, the focusable camera lens is detachably attached to the at least one camera.

Optionally, the focusable camera lens is moveable within the at least one camera. Furthermore, optionally, the focusable camera lens is arranged to allow for converging and/or diverging the reflections of the light pulses as desired to focus the said reflections of the light pulses onto the image plane of the at least one camera. Moreover, in such an instance, the processor is configured to control focal length of the focusable camera lens, based upon a distance between the at least one reflective element and the at least one camera at a given point in time. In other words, the processor is configured to control the focal length of the focusable length based upon an optical distance from the user's eye to the at least one camera via the at least one reflective element.

Additionally, optionally, the processor is configured to control the operative properties associated with focusable camera lens (for example, such as aperture, magnification and the like) of the at least one focusable lens.

Optionally, the gaze-tracking system comprises at least one camera per eye of the user. Optionally, accurate gaze-tracking can be done by employing a single camera for both eyes of the user, since both eyes of the user often move synchronously.

Optionally, the at least one camera is implemented by way of at least one of: a digital camera, a black-and-white camera, a Red-Green-Blue (RGB) camera, an Infra-Red (IR) camera, a hyperspectral camera, an RGB-D camera, a Light Detection and Ranging (LiDAR) camera, a Time-of-Flight (ToF) camera, a laser rangefinder, a stereo camera, a plenoptic camera.

In operation, the reflections of the light pulses from the user's eye are directed towards the at least one camera via the at least one reflective element. Notably, the at least one reflective element is arranged on the optical path of the reflections of the light pulses. Throughout the present disclosure, the term "at least one reflective element" used herein relates to at least one optical component having substantially-reflective properties that allow for altering the optical path of the reflections of the light pulses via reflection therefrom.

Optionally, the at least one reflective element is configured to allow visible light to pass therethrough whilst reflecting the reflections of the light pulses towards the at least one camera. Therefore, the visible light (for example, such as light emanating from at least one image renderer of the head-mounted display apparatus towards the user's eye) can pass through the at least one reflective element. Furthermore, reflections of the visible light can also pass through the at least one reflective element, without being captured by the at least one camera.

In an embodiment, the at least one reflective element has a substantially-flat shape. In another embodiment, the at least one reflective element has a substantially-curved shape. In yet another embodiment, the at least one reflective element has a substantially-freeform shape. In such a case, optionally, the freeform shape is implemented as a combination of flat and curved surfaces including protrusions and depressions on a surface of the at least one reflective element.

Optionally, the at least one reflective element is implemented by way of at least one of: a semi-transparent mirror, an opaque mirror, a semi-transparent film, an opaque reflective film, a prism, a polarizer, an optical waveguide.

Optionally, the at least one reflective element has a controllable curvature. It will be appreciated that such a controllable curvature of the at least one reflective element allows for focusing the reflections of light pulses from the user's eye onto the at least one camera for various positions of the at least one reflective element with respect to the at least one camera. In an exemplary scenario, a change in the position of the at least one reflective element may lead to a change in an optical path of the reflections of the light pulses. Consequently, the reflections of the light pulses may not be well focused at the image plane of the at least one camera. Therefore, in such a scenario, the controllable curvature of the at least one reflective element can be beneficially adjusted in accordance with relative positioning of the at least one reflective element and the at least one camera, to focus the reflections of the light pulses with acceptable sharpness at the at least one camera.

Optionally, the at least one reflective element having a controllable curvature is implemented by way of at least one of: a membrane mirror, an electrically bendable mirror.

In an example implementation, the at least one reflective element is implemented by way of at least one membrane mirror. In such an example, the at least one membrane mirror may comprise a plurality of mirror segments, wherein the plurality of mirror segments are moveable (namely, adjustable) for changing the curvature of the at least one reflective element. Furthermore, the plurality of mirror segments could be substantially-flat and/or substantially-curved in shape.

In another example implementation, the at least one reflective element is implemented by way of at least one electrically bendable mirror. Optionally, in such a case, the at least one electrically bendable mirror is fabricated using a piezoelectric material or an electrostrictive material. In operation, the at least one electrically bendable mirror is deformed (namely, bent) when a voltage is applied thereto, thereby, leading to a change in its curvature. Optionally, the curvature of the at least one reflective element is directly proportional to the voltage applied thereto.

Optionally, when the at least one reflective element has a controllable curvature, the gaze-tracking system further comprises at least one control unit associated with the at least one reflective element, wherein the processor is configured to generate a control signal based upon the position of the at least one reflective element with respect to the at least one camera, and to send the control signal to the at least one control unit, and wherein the at least one control unit is operable to adjust the curvature of the at least one reflective element using the control signal, wherein the curvature of the at least one reflective element is to be adjusted in a manner that the reflections of the light pulses are reflected by the at least one reflective element towards the at least one camera. In such a case, the processor is configured to determine relative positions of the at least one reflective element and the at least one camera, to generate the control signal. Furthermore, optionally, the processor generates the control signal based upon an orientation of the at least one reflective element with respect to the at least one camera. The control unit could be hardware, software, firmware or a combination of these, suitable for adjusting the curvature of the at least one reflective element using the control signal. Furthermore, the control signal could be an electrical signal, pressure, and so forth. In an example, the control unit can adjust the curvature of the at least one reflective element using an electrical signal, wherein a magnitude of the electrical signal can be adjusted to adjust the aforesaid curvature.

The at least one reflective element is moveable using the at least one actuator. In this regard, the at least one actuator is associated with (namely, attached to) the at least one reflective element. Optionally, at least one reflective element is arranged on a platform, wherein the platform is attached to the at least one actuator in a manner that in operation, the at least one actuator moves the platform, and consequently, the at least one reflective element. Moreover, optionally, such movement includes at least one of: displacement (namely, horizontally and/or vertically) of the at least one reflective element, rotation of the at least one reflective element, and/or tilting of the at least one reflective element. Beneficially, such movement of the at least one reflective element using the at least one actuator allows for capturing a front view of the user's eye, even upon change in the user's gaze direction. Such a front view of the user's eye accurately depicts positions of the reflections of the light pulses within the user's eye.

Optionally, the at least one actuator comprises wires and motors, the motors being connected to the wires, the wires being attached to the at least one reflective element. It will be appreciated that the motors and the wire are arranged in a manner that the view of the user is not obstructed. In an example, first ends of the wires may be connected to the motors whilst second ends of the wires may be connected to the platform upon which the at least one reflective element is arranged. The motors may exert a force upon the wires to move the platform, thereby, moving the at least one reflective element. In another example, the first ends of the wires may be connected to the motors whilst the second ends of the wires may be directly connected to the at least one reflective element.

The processor is configured to receive the captured at least one image depicting the reflections of the light pulses, from the at least one camera. The processor is configured to process the at least one image to detect the gaze direction of the user. Optionally, in this regard, the at least one image is processed by employing at least one image processing algorithm. The at least one image processing algorithm is employed to detect the pupil of the user's eye and positions of the reflections of the light pulses from the user's eye with respect to the pupil. Therefore, the at least one image processing algorithm is employed to analyze a relationship between the positions of the pupil of the user's eye and the reflections of the light, to accurately detect the gaze direction of the user. Therefore, the image processing algorithm is optionally implemented for each image of the user's eye. It will be appreciated that a change in the relative positions of the pupil and the reflections of the light, as depicted within the at least one image, is indicative of a change in the gaze direction of the user.

Furthermore, optionally, the processor employs information pertaining to an arrangement of the at least one illuminator, the at least one camera, and the at least one reflective element, for detecting the gaze direction of the user. In such an instance, a position of the at least one illuminator with respect to the user's eye, and the positions of the reflections of the light pulses emitted therefrom, facilitate accurate detection of the gaze direction of the user.

The processor is further configured to control the at least one actuator to adjust, based upon the detected gaze direction of the user, the position of the at least one reflective element. In other words, the processor is configured to adjust a magnitude and/or a direction of movement provided by the at least one actuator, so as to move the at least one reflective element according to the detected gaze direction of the user. Such movement of the at least one reflective element allows for capturing the at least one image with acceptable sharpness, which subsequently enhances an accuracy of the detected gaze direction of the user.

Optionally, the processor is configured to control the at least one actuator by generating at least one actuation signal. Examples of the at least one actuation signal include, but are not limited to, an electric current, a hydraulic pressure, and a mechanical force. As an example, the processor may generate an actuation signal to vertically displace the at least one actuator, and consequently, the at least one reflective element, by one centimetre, upon an upward shift of 0.1 centimetre in the detected gaze of the user. In operation, the processor transmits the generated at least one actuation signal to the at least one actuator for adjusting the position of the at least one reflective element. Furthermore, such an adjustment of the position (namely, movement) of the at least one reflective element is implemented in a manner that the front view of the user's eye depicting the positions of the reflections of the light pulses is captured by the at least one camera. Therefore, an optimal configuration of the gaze-tracking system relates to such an arrangement that allows for capturing the aforesaid front view of the user's eye using the at least one camera. However, in an event of the change in the gaze direction of the user, the aforesaid optimal configuration is disturbed on a temporary basis (for example, for a fraction of a millisecond), namely until the processor controls the at least one actuator to re-adjust the position of the at least one reflective element to achieve the optimal configuration. In such an instance, the processor is configured to employ the at least one image processing algorithm to determine change between an image of the user's eye captured during the optimal configuration and an image of the user's eye captured after disturbance of the optimal configuration. Based upon the determined change, the processor is configured to control the at least one actuator to adjust the position of the at least one reflective element, to maintain the optimal configuration. It will be appreciated that the position of the at least one reflective element is adjusted substantially simultaneously with the change in the gaze direction of the user. For example, the position of the at least one reflective element is adjusted within a fraction of milliseconds after the change in the gaze direction of the user.

Optionally, the at least one camera is operable to capture at least two images of the reflections of the light pulses, wherein the processor is configured to: control the at least one actuator to move the at least one reflective element to a first position; control the at least one camera to capture a first image of the reflections of the light pulses, when the at least one reflective element is arranged at the first position; control the at least one actuator to move the at least one reflective element to a second position, wherein the second position is different from the first position; and control the at least one camera to capture a second image of the reflections of the light pulses, when the at least one reflective element is arranged at the second position. It will be appreciated that the first position and the second position of the at least one reflective element substantially lie along the detected gaze direction of the user's eye. It will be appreciated that such a movement of the at least one reflective element allows for capturing the front view of the user's eye by the at least one camera, even upon change in the gaze direction of the user.

Optionally, the at least one reflective element comprises at least two reflective surfaces with different curvatures, the at least two reflective surfaces being arranged on the platform, and wherein the processor is configured to control the at least one actuator to rotate the platform, so as to adjust an orientation of the at least two reflective surfaces of the at least one reflective element. Optionally, the reflective mirror is fixedly coupled with the platform, wherein the at least one actuator is coupled with the platform. It will be appreciated that the platform can be tilted, moved in horizontal or vertical direction, or rotated along an axis to adjust the orientation of the at least two reflective surfaces. Furthermore, the different curvatures of the at least two reflective surfaces could be beneficially employed for different lengths of an optical path of the reflections of the light pulses. It will be appreciated that a length of the optical path of the reflections of the light pulses is equivalent to a sum of a distance between the user's eye and the at least one reflective element and a distance between the at least one reflective element and the at least one camera. Moreover, the different curvatures of the at least two reflective surfaces could be beneficially employed for directing the reflections of the light pulses into different directions. As an example, the at least one reflective element may comprise a first reflective surface having a first curvature and a second reflective surface having a second curvature, wherein the first curvature is substantially smaller than the second curvature. In such an example, the processor may control the at least one actuator to rotate a platform upon which the first and the second reflective surfaces are arranged, in a manner that (i) the reflections of light pulses are incident upon the first reflective surface when their optical path is short, and (ii) the reflections of light pulses are incident upon the second reflective surface when their optical path is long.

In one example implementation, the at least one reflective element is implemented by way of a single reflective element having two reflective surfaces of two different curvatures. In an example, a first reflective surface of the reflective element may be substantially-flat and a second reflective surface of the reflective element may be substantially-curved. In such an example, the processor can control the at least one actuator to change the orientation of the reflective element such that (i) the reflections of the light pulses are incident upon the first reflective surface, to subsequently be reflected towards a first direction and (ii) the reflections of the light pulses are incident upon the second reflective surface, to subsequently be reflected towards a second direction.

In another example implementation, the at least one reflective element comprises two or more reflective elements having different curvatures. Optionally, the two or more reflective elements are arranged on the platform. In an example, the platform may be perpendicularly arranged with respect to the at least one actuator. In such an example, the two or more reflective elements are arranged on either side of the platform. In another example, one or more platforms may be attached with the at least one actuator. In an example, a first reflective element may be substantially-flat and a second reflective element may be substantially-curved. In such an example, the processor can control the at least one actuator to change the orientation the two or more reflective elements such that (i) the reflections of the light pulses are incident upon the first reflective element, to subsequently be reflected towards a first direction and (ii) the reflections of the light pulses are incident upon the second reflective element, to subsequently be reflected towards a second direction.

Optionally, the at least one camera comprises at least two cameras, and the at least one image comprises the at least two images of the reflections of the light pulses as captured by the at least two cameras, the at least two cameras being arranged to view the user's eye through different reflective surfaces of the at least one reflective element having different curvatures. In such a case, the at least two images of the reflections of the light pulses could be captured from a same perspective or a different perspective. Furthermore, owing to different curvatures of the different reflective surfaces, the at least two images may be focused with different sharpness at the at least two cameras. In such a case, even upon blurriness in one of the at least two images, the gaze direction of the user can be detected by using other image(s) of the at least two images. Moreover, the different reflective surfaces of the at least one reflective element may be arranged with respect to the at least two cameras in a manner that allows for reducing a size of the head-mounted display apparatus. In such a case, the different curvatures of the different reflective surfaces can direct the reflections of the light pulses towards the at least two cameras in a desired manner.

As an example, the at least one reflective element may have two reflective surfaces, such as a first surface and a second surface, with different curvatures. In such an example, the first surface may be arranged to reflect the reflections of the light pulses towards a first direction, whilst the second surface may be arranged to reflect the reflections of the light pulses towards a second direction. Furthermore, the at least one camera may comprise at least two cameras, such as a first camera and a second camera. In such a case, the first camera may be positioned substantially along the first direction such that the reflections of the light pulses (reflected by the first surface) are captured by the first camera as a first image. Similarly, the second camera may be positioned substantially along the second direction such that the reflections of the light pulses (reflected by the second surface of the at least one reflective element) are captured by the second camera as a second image.

Optionally, when processing the at least one image to detect the gaze direction of the user, the processor is configured to generate a virtual camera image from the at least two images, and to analyze the virtual camera image to detect the gaze direction of the user. In such a case, the at least two images depict different front-perspective views of the reflections of the light pulses from the user's eye.

Optionally, the processor employs at least one virtual camera view interpolation algorithm whilst processing the at least two images, to generate the virtual camera image. The at least one virtual camera view interpolation algorithm allows for generating the virtual camera image by estimating a view of the user's eye that is to be depicted in the virtual camera image, based upon the different front-perspective views depicted in the captured at least two images. Such virtual camera view interpolation algorithms are well-known in the art. Throughout the present disclosure, the term "virtual camera image" used herein relates to an image of the user's eye that is captured via a virtual camera. It is to be understood that the virtual camera is not a physical camera, but a viewpoint from where it is desired to capture the virtual camera image. Therefore, the virtual camera image depicts a front-perspective view of the user's eye, which would be captured from a desired position of the virtual camera. Optionally, the virtual camera image depicts a view of the user's eye (and the reflections of the light pulses therein), as seen from the at least one reflective element. Therefore, in such a case, the virtual camera image can be beneficially analyzed using the at least one image processing algorithm to accurately detect the gaze direction of the user.

Optionally, the at least one camera has a focusable camera lens, and the processor is configured to adjust a focal length of the focusable camera lens based upon the position of the at least one reflective element with respect to the at least one camera. In other words, the processor is configured to adjust the focal length of the focusable camera lens based upon a distance between the at least one reflective element and the at least one camera at a given point in time. Notably, such a distance between the at least one reflective element and the at least one camera relates to an optical distance from the user's eye to the at least one camera, via the at least one reflective element. The focal length of the focusable camera lens is adjustable to allow for sharply focusing the reflections of the light pulses onto the image plane of the at least one camera any given point in time.

Optionally, the focusable camera lens is implemented as a lens subsystem comprising at least one optical component. Examples of the at least one optical component include, but are not limited to, a convex lens, a concave lens, a plano-convex lens, a plano-concave lens, a Liquid Crystal (LC) lens, and a liquid lens.

Optionally, the focusable camera lens is non-detachably integrated within (namely, fixed within) the at least one camera. Alternatively, optionally, the focusable camera lens is detachably attached to the at least one camera.

Optionally, the processor is configured to move the focusable camera lens to adjust the focal length of the camera lens. In such a case, the processor is configured to move the at least one optical component of the focusable camera lens, for example, by way of actuators.

Additionally, optionally, the processor is configured to control at least one operative property associated with the focusable camera lens whilst capturing the at least one image of the reflections of the light pulses from the user's eye. Examples of the at least one operative property include, but are not limited to, aperture of the focusable camera lens, and magnification of the focusable lens.

Optionally, the head-mounted display apparatus comprises a substantially-planar component having a first side and a second side opposite to the first side, the first side facing the user's eye when the head-mounted display apparatus is worn by the user. In such a case, the at least one actuator comprises a first magnet and a second magnet, the first magnet being attached to the at least one reflective element, the at least one reflective element being positioned on the first side of the substantially-planar component, the second magnet being positioned on the second side of the substantially-planar component. It will be appreciated that the substantially-planar component acts as a substrate for supporting the first magnet and the second magnet of the at least one actuator. Optionally, the first magnet and the second magnet are substantially aligned along an axis that is substantially perpendicular to the substantially-planar component. Optionally, the first magnet and the second magnet are rotatably and slidably arranged upon the substantially-planar component. In such a case, the first magnet and the second magnet are rotatable about the axis that is substantially perpendicular to the substantially-planar component. Optionally, the first magnet and the second magnet are arranged on either sides of the substantially-planar component in a manner that there exists a strong coercive force therebetween. Therefore, a change in position of the second magnet results in a corresponding change in position of the first magnet.

In operation, the processor is configured to generate the at least one actuation signal to move the second magnet. Upon receiving such at least one actuation signal, the position of the second magnet is adjusted, thereby leading to the change in the position of the first magnet and the at least one reflective element attached therewith. Examples of the first magnet and the second magnet include, but are not limited to a temporary magnet, a permanent magnet, and an electromagnet.

Optionally, the substantially-planar component is implemented by way of one of: an opaque plastic element, a semi-transparent plastic element, a reflective mirror.

Optionally, the substantially-planar component is arranged in a manner that at least one image renderer of the head-mounted display apparatus lies between the user's eye and the substantially-planar component. As a result, the substantially-planar component is not visible to the user when the head-mounted display apparatus is in operation. In such a case, the at least one image renderer is configured to pass the reflections of the light pulses having infrared wavelength therethrough, towards the at least one reflective element arranged on the substantially-planar component. Therefore, the reflections of the light pulses having infrared wavelength are incident upon the at least one reflective element wherefrom, the reflections of the light pulses are reflected towards the at least one camera.

Alternatively, optionally, the substantially-planar component is a part of at least one image renderer of the head-mounted display apparatus. Optionally, the head-mounted display apparatus comprises:

at least one focus image renderer, the at least one focus image renderer being operable to render a focus image, wherein an angular width of a projection of the rendered focus image ranges from 5 degrees to 60 degrees;

at least one context image renderer, the at least one context image renderer being operable to render a context image, wherein an angular width of a projection of the rendered context image ranges from 40 degrees to 220 degrees; and at least one optical combiner comprising at least one first optical element that is substantially transparent for infrared light, the at least one optical combiner being employed to optically combine the projection of the rendered focus image with the projection of the rendered context image to create the visual scene to be presented to the user, the at least one first optical element being positioned on an optical path of the reflections of the light pulses, wherein the at least one reflective element is to be positioned in a manner that the at least one reflective element hides behind a portion of the at least one first optical element upon which the projection of the focus image is incident.

Optionally, in such a case, the substantially-planar component is a part of the at least one context image renderer and/or the at least one focus image renderer. Optionally, in this regard, the at least one context image renderer and/or the at least one focus image renderer are employed to implement the substantially-planar component. As an example, the substantially-planar component may be implemented as a projection screen onto which the context image and/or the focus image are projected.

It will be appreciated that the term "context image" used herein relates to a wide image of the visual scene, to be rendered and projected via the head-mounted display apparatus. Furthermore, the term "focus image" relates to another image depicting a part (namely, a portion) of the visual scene, to be rendered and projected via the display apparatus. Therefore, it is to be understood that the focus image is dimensionally smaller than the context image. The context and focus images collectively constitute the visual scene upon optical combination thereof. Furthermore, it is to be understood that the rendered focus image is typically projected on and around the fovea of the user's eyes, whereas the rendered context image is projected on the retina of the user's eyes, of which the fovea is just a small part. Moreover, the rendered context and focus images collectively constitute a stereoscopic image of the visual scene to be presented to the user of the display apparatus.

Throughout the present disclosure, the term "angular width" refers to an angular width of a given projection as seen from the user's eyes, when the display apparatus is worn by the user. It will be appreciated that the angular width of the projection of the rendered focus image is smaller than the angular width of the projection of the rendered context image, since the rendered focus image is typically projected on and around the fovea of the user's eyes, whereas the rendered context image is projected upon the retina of the user's eyes.

In some implementations, the angular width of the projection of the rendered context image may be, for example, 40, 50, 60, 70, 80, 90, 100, 110, 120, 130, 140, 150, 160, 170, 180, 190, 200, 210 or 220 degrees, whereas the angular width of the projection of the rendered focus image may be, for example, 5, 10, 15, 20, 25, 30, 35, 40, 45, 50, 55 or 60 degrees. It will be appreciated that the aforesaid angular widths of the context and focus images allow for coping with saccades and microsaccades associated with movement of the user's eyes.

In other implementations, the angular width of the projection of the rendered context image is greater than 220 degrees.

Throughout the present disclosure, the term "context image renderer" used herein relates to equipment configured to facilitate rendering of the context image. Similarly, the term "focus image renderer" used herein relates to equipment configured to facilitate rendering of the focus image.

Optionally, the at least one image renderer and/or the at least one context image renderer and/or the at least one focus image renderer are implemented by way of at least one projector and a projection screen associated therewith. Optionally, a single projection screen may be shared between separate projectors employed to implement the at least one context image renderer and the at least one focus image renderer. Optionally, the at least one projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Optionally, the at least one image renderer and/or the at least one context image renderer and/or the at least one focus image renderer is implemented by way of at least one display. Optionally, in this regard, the at least one image renderer is implemented by way of at least one display configured to emit the projection of an image therefrom. Alternatively, optionally, the at least one context image renderer is implemented by way of at least one context display configured to emit the projection of the rendered context image therefrom, and the at least one focus image renderer is implemented by way of at least one focus display configured to emit the projection of the rendered focus image therefrom. In such a case, the term "context display" used herein relates to a display (or screen) configured to facilitate rendering of the context image thereon. Similarly, the term "focus display" used herein relates to a display (or screen) configured to facilitate rendering of the focus image thereon. Optionally, the at least one display and/or the at least one context display and/or the at least one focus display are selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Furthermore, optionally, dimensions of the at least one context display are larger as compared to dimensions of the at least one focus display. Specifically, the at least one focus display may be much smaller in size than the at least one context display.

Throughout the present disclosure, the term "at least one optical combiner" used herein relates to equipment (for example, such as optical elements) for optically combining the projection of the rendered context image and the projection of the rendered focus image to constitute the visual scene. Beneficially, the at least one optical combiner could be configured to simulate active foveation of a human visual system.

Optionally, when the at least one first optical element is substantially transparent for infrared light, the at least one first optical element is configured to allow the reflections of the light pulses having infrared wavelength to pass therethrough substantially, towards the at least one reflective element.

Optionally, the at least one first optical element of the at least one optical combiner is implemented by way of at least one of: a semi-transparent mirror, a semi-transparent film, a prism, a polarizer, an optical waveguide.

In one implementation, the at least one focus image renderer and the at least one context image renderer are arranged in a manner that the projection of the rendered focus image is reflected from the at least one first optical element towards the user's eye and the projection of the rendered context image passes through the at least one first optical element towards the user's eye. In such an implementation, the projection of the rendered focus image is incident upon a first side of the at least one first optical element that faces the user's eye. Therefore, in such an implementation, the at least one reflective element is positioned in a manner that the at least one reflective element hides behind a portion of the first side of the at least one first optical element upon which the projection of the rendered focus image is incident, namely, between the at least one first optical element and the at least one context image renderer.

In another implementation, the at least one focus image renderer and the at least one context image renderer are arranged in a manner that the projection of the rendered focus image passes through the at least one first optical element towards the user's eye and the projection of the rendered context image is reflected from the at least one first optical element towards the user's eye. In such an implementation, the projection of the rendered focus image is incident upon a second side of the at least one first optical element that faces away from the user's eye (for example, such as the second side that is substantially opposite to the first side of the at least one first optical element). Therefore, in such an implementation, the at least one reflective element is positioned in a manner that the at least one reflective element hides behind a portion of the second side of the at least one first optical element upon which the projection of the rendered focus image is incident, namely, behind the at least one focus image renderer.

Furthermore, it will be appreciated that the processor of the gaze-tracking system is optionally implemented by way of a processor of the head-mounted display apparatus. In an alternative implementation, the gaze-tracking system and the head-mounted display apparatus have separate processors.

Optionally, the processor of the head-mounted display apparatus is configured to:
(a) receive the detected gaze direction of the user from the gaze-tracking system;
(b) receive the image to be displayed to the user of the head-mounted display apparatus, and use the detected gaze direction of the user to determine a region of visual accuracy of the image;
(c) process the image to generate the context image and the focus image, the context image having a first resolution and the focus image having a second resolution, wherein:
a region of the context image that substantially corresponds to the region of visual accuracy of the image is masked,
the focus image substantially corresponds to the region of visual accuracy of the image, and
the second resolution is higher than the first resolution; and
(d) render the context image at the at least one context image renderer and the focus image at the at least one focus image renderer substantially simultaneously, whist controlling the at least one optical combiner to combine the projection of the rendered context image with the projection of the rendered focus image in a manner that the projection of the rendered focus image substantially overlaps the projection of the masked region of the rendered context image.

Optionally, in this regard, the image to be displayed to the user of the head-mounted display apparatus is received from an imaging device and/or a memory unit communicably coupled to the head-mounted display apparatus. More optionally, the memory unit is implemented by way of hardware, software, firmware or a combination of these, suitable for storing the image.

Furthermore, it is to be understood that the term "region of visual accuracy" used herein relates to a region of the image whereat the detected gaze direction of the user is directed (namely, focused) when the user of the head-mounted display apparatus views the image. Therefore, the region of visual accuracy is a fixation region within the image. In other words, the region of visual accuracy is a region of interest (or a fixation point) within the image, and is projected onto the fovea of the user's eyes. Therefore, the region of visual accuracy relates to a region resolved to a much greater detail as compared to other regions of the image, when the image is viewed by the human visual system. Furthermore, optionally, the second resolution (of the focus image) is higher than the first resolution (of the context image) since the rendered focus image is typically projected by the head-mounted display apparatus on and around the fovea of the user's eyes, whereas the rendered context image is projected by the head-mounted display apparatus upon the retina of the user's eyes. Such resolution of the focus and context images allow for emulating visual characteristics of the human visual system when the image is viewed by the user of the head-mounted display apparatus.

Moreover, optionally, the region of visual accuracy of the image is represented within both the rendered context image of low resolution and the rendered focus image of high resolution. Moreover, the rendered focus image having a high resolution may include more information pertaining to the region of visual accuracy of the image, as compared to the rendered context image having a low resolution. Therefore, it will be appreciated that the processor optionally masks the region of the context image that substantially corresponds to the region of visual accuracy of the image in order to avoid optical distortion of the region of visual accuracy of the image, when the projection of the focus image is combined with the projection of the rendered context image. As an example, pixels of the context image corresponding to the region of visual accuracy of the image may be dimmed (namely, darkened) for masking.

Optionally, the at least one reflective element is movably arranged upon the at least one context image renderer in a manner that the at least one reflective element substantially overlaps a region of the at least one context image renderer that corresponds to the masked region of the rendered context image. More optionally, dimensions (namely, a size) of the at least one reflective element is smaller than dimensions of the masked region of the rendered context image.

Therefore, in such a case, since the projection of the rendered focus image substantially overlaps the projection of the masked region of the rendered context image, the at least one reflective element does not obstruct the user's view.

Furthermore, optionally, with change in the gaze direction of the user, the region of the at least one context image renderer that corresponds to the masked region of the rendered context image also changes. Therefore, in such a case, the processor is configured to move the at least one reflective element in a manner that the at least one reflective element continues to substantially overlap the masked region of the rendered context image. For example, when the gaze direction of the user changes from a region A of the image to a region B of the image, a region of visual accuracy of the image also changes (notably, from the region A to region B). Therefore, a masked region of the rendered context image also changes from a first region to a second region of the at least one context image renderer. In such a case, the processor may control the at least one actuator to move the at least one reflective element to substantially overlap the first region and consequently, the second region.

The present disclosure also relates to the method as described above. Various embodiments and variants disclosed above apply mutatis mutandis to the method.

Optionally, in the method, the at least one reflective element comprises the at least two reflective surfaces with different curvatures, the at least two reflective surfaces being arranged on the platform, and wherein the method comprises controlling the at least one actuator to rotate the platform, so as to adjust the orientation of the at least two reflective surfaces of the at least one reflective element.

Optionally, in the method, the at least one camera comprises the at least two cameras, the at least one image comprises the at least two images of the reflections of the light pulses as captured by the at least two cameras, and wherein the method comprises arranging the at least two cameras to view the user's eye through different reflective surfaces of the at least one reflective element having different curvatures.

Optionally, in the method, the at least one camera is operable to capture the at least two images of the reflections of the light pulses, and wherein the method comprises:

controlling the at least one actuator to move the at least one reflective element to the first position;

capturing, via the at least one camera, the first image of the reflections of the light pulses, when the at least one reflective element is arranged at the first position;

controlling the at least one actuator to move the at least one reflective element to the second position, wherein the second position is different from the first position; and capturing, via the at least one camera, the second image of the reflections of the light pulses, when the at least one reflective element is arranged at the second position.

Optionally, when processing at the step (iii), the method comprises generating the virtual camera image from the at least two images; and the virtual camera image is analyzed to detect the gaze direction of the user.

Optionally, in the method, the at least one reflective element has the controllable curvature, wherein the method further comprises:

(v) generating the control signal based upon the position of the at least one reflective element with respect to the at least one camera; and (vi) adjusting the curvature of the at least one reflective element using the control signal, wherein the curvature of the at least one reflective element is adjusted in a manner that the reflections of the light pulses are reflected by the at least one reflective element towards the at least one camera.

Optionally, in the method, the at least one camera has the focusable camera lens, and the method further comprises adjusting the focal length of the camera lens based upon the position of the at least one reflective element with respect to the at least one camera.

Optionally, in the method, the light pulses emitted by the at least one illuminator have the infrared wavelength or the near-infrared wavelength.

Optionally, in the method, the head-mounted display apparatus comprises the at least one focus image renderer, the at least one context image renderer and the at least one optical combiner, the at least one optical combiner comprising at least one first optical element that is substantially transparent for infrared light, the at least one first optical element being positioned on the optical path of the reflections of the light pulses, wherein the method further comprises:

(vii) rendering the focus image at the at least one focus image renderer, wherein the angular width of a projection of the rendered focus image ranges from 5 degrees to 60 degrees;

(viii) rendering the context image at the at least one context image renderer, wherein the angular width of a projection of the rendered context image ranges from 40 degrees to 220 degrees;

(ix) employing the at least one optical combiner to optically combine the projection of the rendered focus image with the projection of the rendered context image to create the visual scene to be presented to the user; and (x) positioning the at least one reflective element in a manner that the at least one reflective element hides behind the portion of the at least one first optical element upon which the projection of the focus image is incident.

DETAILED DESCRIPTION OF THE DRAWINGS

Referring to FIG. 1, illustrated is a block diagram of a gaze-tracking system 100 for use in a head-mounted display apparatus (not shown), in accordance with an embodiment of the present disclosure. The gaze tracking system 100 comprises at least one illuminator 102 operable to emit light pulses that are to be used to illuminate a user's eye when the head-mounted display apparatus is worn by the user, at least one camera 104 operable to capture at least one image of reflections of the light pulses from a user's eye, at least one reflective element 106 arranged on an optical path of the reflections of the light pulses, at least one actuator 108 associated with the at least one reflective element 106 and a processor 110 coupled in communication with the at least one illuminator 102, the at least one camera 104 and the at least one actuator 108. The at least one reflective element 106 is to be arranged such that when incident thereupon, the reflections of the light pulses are reflected towards the at least one camera 104. The processor 110 is configured to process the at least one image to detect a gaze direction of the user and control the at least one actuator 108 to adjust, based upon the detected gaze direction of the user, a position of the at least one reflective element 106.

Referring to FIGS. 2A-2E, illustrated are exemplary implementations of a gaze-tracking system 200 in use within a head-mounted display apparatus, in accordance with various embodiments of the present disclosure. It may be understood by a person skilled in the art that the FIGS. 2A-2E include simplified arrangements for implementation of the gaze-tracking system 200 for sake of clarity, which should not unduly limit the scope of the claims herein. The person skilled in the art will recognize many variations, alternatives, and modifications of embodiments of the present disclosure.

As shown in FIGS. 2A-2E, the gaze-tracking system 200 comprises at least one illuminator, depicted as an illuminator 202, operable to emit light pulses. For sake of simplicity, the emitted light pulses are depicted by ray A. The emitted light pulses are used to illuminate a user's eye 204 when the head-mounted display apparatus is worn by the user. Furthermore, the gaze-tracking system 200 comprises at least one camera, depicted as a camera 206, operable to capture at least one image of reflections of the light pulses from the user's eye. Such reflections of the light pulses are depicted by ray B. As shown, at least one reflective element, depicted as a reflective element 208 is arranged on an optical path of the reflections of the light pulses B. In operation, the reflections of the light pulses B, when incident upon the at least one reflective element 208, are reflected towards the at least one camera 206. Furthermore, the gaze tracking system 200 comprises at least one actuator, depicted as an actuator 210 associated with the at least one reflective element 208. The at least one actuator 210 is to be employed to move the at least one reflective element 208.

Referring to FIGS. 2B-2E, the head-mounted display apparatus optionally comprises at least one image renderer 212. The at least one image renderer 212 functions as a substantially planar component of the head-mounted display apparatus.

In FIG. 2B, the at least one image renderer 212 comprises a first side FS and a second side SS opposite to the first side FS. The first side FS faces the user's eye 204 when the head-mounted display apparatus is worn by the user. As shown, the at least one reflective element 208 is placed in a manner that the second side SS faces the at least one reflective element 208. In operation, the reflections of the light pulses B pass through the at least one image renderer 212 and are incident upon the at least one reflective element 208. Thereafter, the reflections of the light pulses B are reflected towards the at least one camera 206.

Figure 2A:
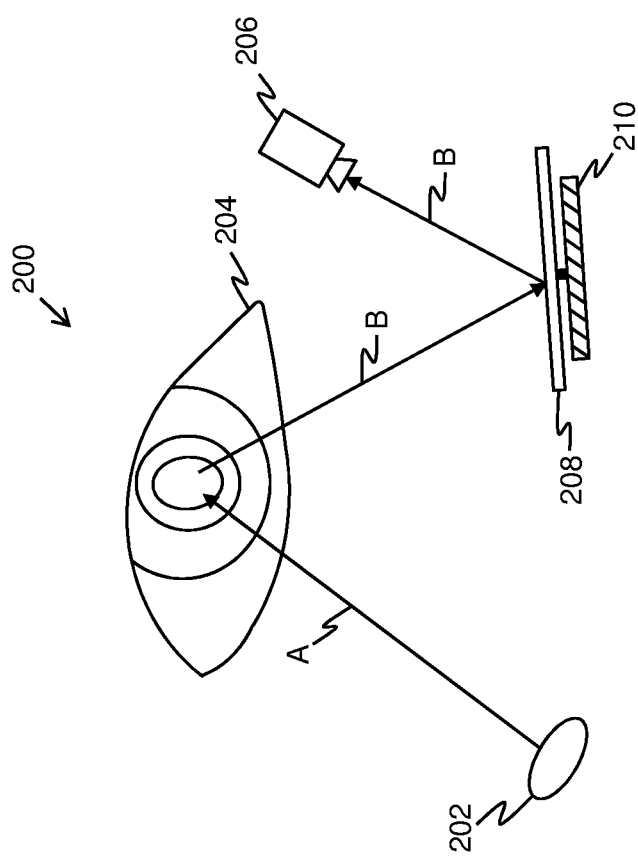
Figure 2C:
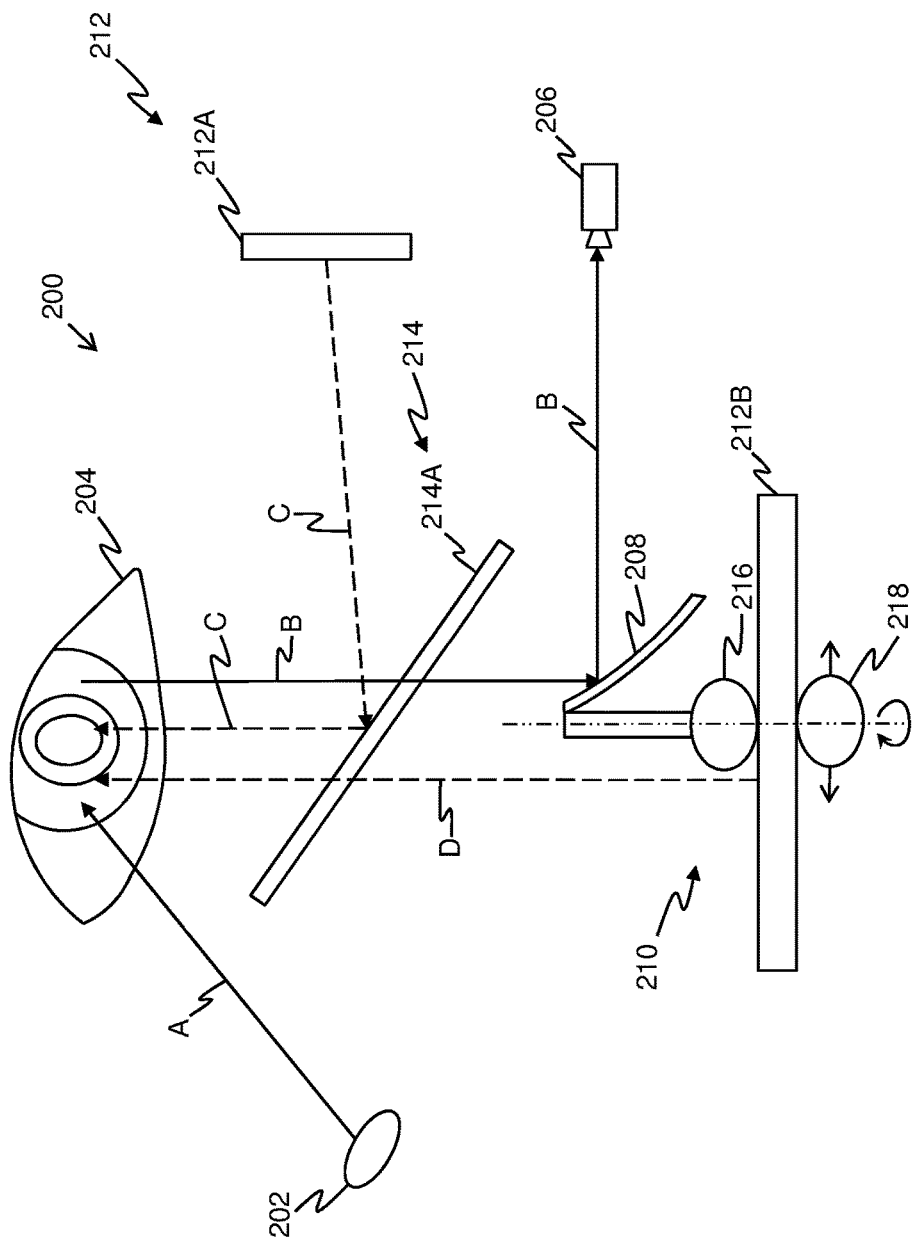
Figure 2E:
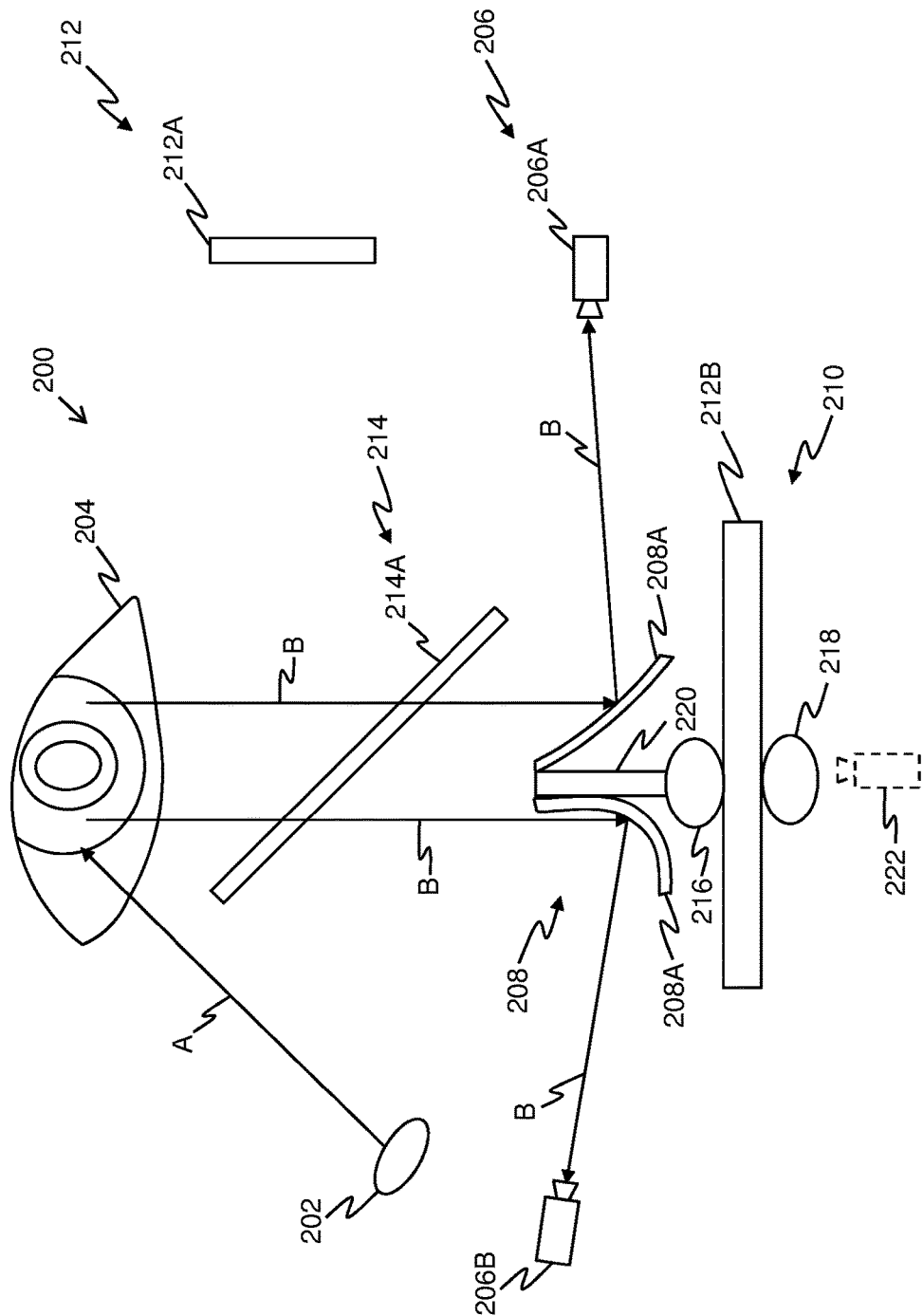

Referring to FIG. 2C-2E, the head-mounted display apparatus comprises at least one optical combiner 214. The at least one optical combiner 214 comprises at least one first optical element 214A that is substantially transparent for infrared light. Furthermore, the at least one image renderer 212 is shown to optionally comprises at least one focus image renderer, depicted as a focus image renderer 212A, being operable to render a focus image and at least one context image renderer, depicted as a context image renderer 212B, operable to render a context image. Furthermore, as shown, the at least one actuator 210 comprises a first magnet 216 and a second magnet 218. The first magnet 216 is attached to the at least one reflective element 208 being positioned on a first side of the at least one context image renderer 212B (facing towards the user's eye), and the second magnet 218 is positioned on a second side (opposite to the first side) of the at least one context image renderer 212B. As shown, the first magnet 216 and the second magnet 218 are rotatable about an axis (depicted as a dashed-dot line) that is substantially perpendicular to the context image renderer 212B.

In FIG. 2C, a projection of the rendered focus image is depicted by ray C whereas a projection of the rendered context image is depicted by ray D. For sake of clarity, the ray C and the ray D are depicted by way of dashed lines. In operation the at least one optical combiner 214 optically combines the projection of the rendered focus image C with the projection of the rendered context image D to create a visual scene to be presented to the user. Furthermore, as shown, the at least one first optical element 214A is positioned on an optical path of the reflections of the light pulses B. The at least one reflective element 208 is positioned in a manner that the at least one reflective element 208 hides behind a portion of the at least one first optical element 214A upon which the projection of the focus image C is incident.

In FIGS. 2D and 2E, the at least one reflective element 208 comprises at least two reflective surfaces, depicted as reflective surfaces 208A and 208B with different curvatures. As shown, the at least two reflective surfaces 208A and 208B are arranged on a platform 220. Furthermore, the at least one camera 206 optionally comprises at least two cameras, depicted as cameras 206A and 206B. The at least two cameras 206A and 206B are arranged to view the user's eye 204 through different reflective surfaces 208A and 208B respectively of the at least one reflective element 208 having different curvatures.

In FIG. 2E, a processor (not shown) of the gaze-tracking system 200 is configured to generate a virtual camera image from the at least two images of reflections of the light pulses (captured by the at least two cameras 206A and 206B), and to analyze the virtual camera image to detect the gaze direction of the user. As shown, a desired position of a virtual camera 222 lies substantially along the gaze direction of the user's eye. It will be appreciated that the virtual camera 222 is not a physical camera, but a viewpoint from where it is desired to capture the virtual camera image.

Figure 3:
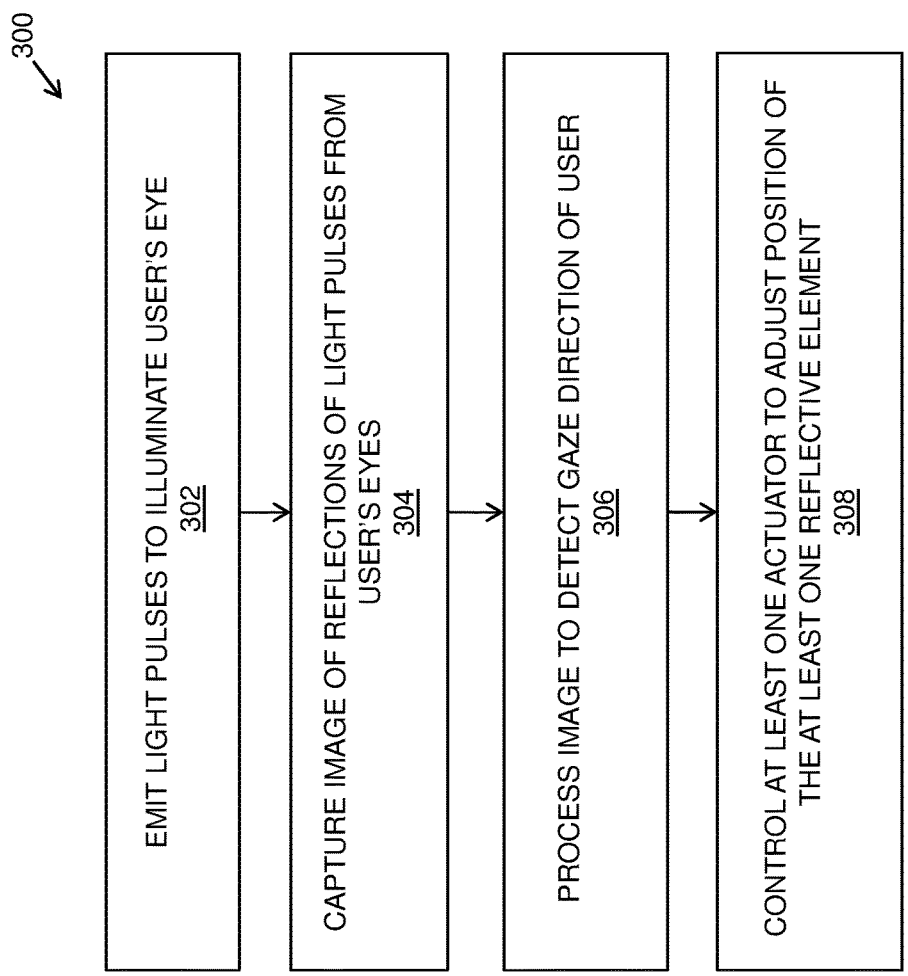
FIG. 3 illustrates steps of a method of tracking a user's gaze, via a gaze-tracking system of a head-mounted display apparatus, in accordance with an embodiment of the present disclosure.

Referring to FIG. 3, illustrated are steps of a method 300 of tracking a user's gaze, via a gaze-tracking system of a head-mounted display apparatus, in accordance with an embodiment of the present disclosure. At step 302, light pulses are emitted via the at least one illuminator to illuminate a user's eye, when the head-mounted display apparatus is worn by the user. At step 304, at least one image of reflections of the light pulses from the user's eyes is captured. At least one reflective element is arranged on an optical path of the reflections of the light pulses, such that when incident upon the at least one reflective element, the reflections of the light pulses are reflected towards the at least one camera. At step 306, the at least one image is processed to detect a gaze direction of the user. At step 308, the at least one actuator is controlled to adjust a position of the at least one reflective element, based upon the detected gaze direction of the user. It will be appreciated that the steps 302 to 308 are performed iteratively to detect the gaze detection of the user.

The steps 302 to 308 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A gaze-tracking system for use in a head-mounted display apparatus, the gaze-tracking system comprising:
    at least one illuminator, the at least one illuminator being operable to emit light pulses, wherein the light pulses are to be used to illuminate a user's eye when the head-mounted display apparatus is worn by the user;
    at least one camera, the at least one camera being operable to capture at least one image of reflections of the light pulses from the user's eye;
    at least one reflective element, wherein the at least one reflective element is to be arranged on an optical path of the reflections of the light pulses, such that when incident upon the at least one reflective element, the reflections of the light pulses are reflected towards the at least one camera;
    at least one actuator associated with the at least one reflective element, wherein the at least one actuator is to be employed to move the at least one reflective element; and
(i) a processor coupled in communication with the at least one illuminator, the at least one camera and the at least one actuator, the processor being configured to:
(ii) control the at least one actuator to adjust, based upon the detected gaze direction of the user, a position of the at least one reflective element;
wherein the at least one camera is operable to capture at least two images of the reflections of the light pulses, and wherein the processor is configured to:
    control the at least one actuator to move the at least one reflective element to a first position;
    control the at least one camera to capture a first image of the reflections of the light pulses, when the at least one reflective element is arranged at the first position;
    control the at least one actuator to move the at least one reflective element to a second position, wherein the second position is different from the first position; and control the at least one camera to capture a second image of the reflections of the light pulses, when the at least one reflective element is arranged at the second position.

2. A gaze-tracking system of claim 1, wherein the at least one reflective element comprises at least two reflective surfaces with different curvatures, the at least two reflective surfaces being arranged on a platform, and
wherein the processor is configured to control the at least one actuator to rotate the platform, so as to adjust an orientation of the at least two reflective surfaces of the at least one reflective element.

3. A gaze-tracking system of claim 2, wherein the at least one camera comprises at least two cameras, and the at least one image comprises at least two images of the reflections of the light pulses as captured by the at least two cameras, the at least two cameras being arranged to view the user's eye through different reflective surfaces of the at least one reflective element having different curvatures.

4. A gaze-tracking system of claim 1, wherein, when processing at (i), the processor is configured to generate a virtual camera image from the at least two images, and to analyze the virtual camera image to detect the gaze direction of the user.

5. A gaze-tracking system of claim 1, wherein the at least one reflective element has a controllable curvature.

6. A gaze-tracking system of claim 5, further comprising at least one control unit associated with the at least one reflective element, wherein the processor is configured to generate a control signal based upon the position of the at least one reflective element with respect to the at least one camera, and to send the control signal to the at least one control unit, and
wherein the at least one control unit is operable to adjust the curvature of the at least one reflective element using the control signal, wherein the curvature of the at least one reflective element is to be adjusted in a manner that the reflections of the light pulses are reflected by the at least one reflective element towards the at least one camera.

7. A gaze-tracking system of claim 1, wherein the at least one camera has a focusable camera lens, and the processor is configured to adjust a focal length of the focusable camera lens based upon the position of the at least one reflective element with respect to the at least one camera.

8. A gaze-tracking system of claim 1, wherein the head-mounted display apparatus comprises a substantially-planar component having a first side and a second side opposite to the first side, the first side facing the user's eye when the head-mounted display apparatus is worn by the user, and
wherein the at least one actuator comprises a first magnet and a second magnet, the first magnet being attached to the at least one reflective element, the at least one reflective element being positioned on the first side of the substantially-planar component, the second magnet being positioned on the second side of the substantially-planar component.

9. A gaze-tracking system of claim 8, wherein the substantially-planar component is a part of at least one image renderer of the head-mounted display apparatus.

10. A gaze-tracking system of claim 1, wherein the at least one actuator comprises wires and motors, the motors being connected to the wires, the wires being attached to the at least one reflective element.

11. A gaze-tracking system of claim 1, wherein the light pulses emitted by the at least one illuminator have an infrared wavelength or a near-infrared wavelength.

12. A gaze-tracking system of claim 1, wherein the head-mounted display apparatus comprises:
at least one focus image renderer, the at least one focus image renderer being operable to render a focus image, wherein an angular width of a projection of the rendered focus image ranges from 5 degrees to 60 degrees;
at least one context image renderer, the at least one context image renderer being operable to render a context image, wherein an angular width of a projection of the rendered context image ranges from 40 degrees to 220 degrees; and
at least one optical combiner comprising at least one first optical element that is substantially transparent for infrared light, the at least one optical combiner being employed to optically combine the projection of the rendered focus image with the projection of the rendered context image to create a visual scene to be presented to the user, the at least one first optical element being positioned on an optical path of the reflections of the light pulses,
wherein the at least one reflective element is to be positioned in a manner that the at least one reflective element hides behind a portion of the at least one first optical element upon which the projection of the focus image is incident.

13. A method of tracking a user's gaze, via a gaze-tracking system of a head-mounted display apparatus, the gaze-tracking system comprising at least one illuminator, at least one camera, at least one reflective element and at least one actuator associated with the at least one reflective element, the method comprising:
(i) emitting light pulses, via the at least one illuminator, the light pulses being used to illuminate a user's eye when the head-mounted display apparatus is worn by the user;
(ii) capturing, via the at least one camera, at least one image of reflections of the light pulses from the user's eyes, wherein the at least one reflective element is arranged on an optical path of the reflections of the light pulses, such that when incident upon the at least one reflective element, the reflections of the light pulses are reflected towards the at least one camera;
(iii) processing the at least one image to detect a gaze direction of the user; and
(iv) controlling the at least one actuator to adjust, based upon the detected gaze direction of the user, a position of the at least one reflective element;
wherein the at least one camera is operable to capture at least two images of the reflections of the light pulses, and wherein the method further comprises:
controlling the at least one actuator to move the at least one reflective element to a first position;
capturing, via the at least one camera, a first image of the reflections of the light pulses, when the at least one reflective element is arranged at the first position;
controlling the at least one actuator to move the at least one reflective element to a second position, wherein the second position is different from the first position; and
capturing, via the at least one camera, a second image of the reflections of the light pulses, when the at least one reflective element is arranged at the second position.

14. A method of claim 13, wherein the at least one reflective element comprises at least two reflective surfaces with different curvatures, the at least two reflective surfaces being arranged on a platform, and wherein the method comprises controlling the at least one actuator to rotate the platform, so as to adjust an orientation of the at least two reflective surfaces of the at least one reflective element.

15. A method of claim 14, wherein the at least one camera comprises at least two cameras, the at least one image comprises at least two images of the reflections of the light pulses as captured by the at least two cameras, and wherein the method comprises arranging the at least two cameras to view the user's eye through different reflective surfaces of the at least one reflective element having different curvatures.

16. A method of claim 15, wherein the processing at the step (iii) comprises generating a virtual camera image from the at least two images; and analyzing the virtual camera image to detect the gaze direction of the user.

17. A method of claim 13, wherein the at least one reflective element has a controllable curvature, wherein the method further comprises:
(v) generating a control signal based upon the position of the at least one reflective element with respect to the at least one camera; and
(vi) adjusting the curvature of the at least one reflective element using the control signal, wherein the curvature of the at least one reflective element is adjusted in a manner that the reflections of the light pulses are reflected by the at least one reflective element towards the at least one camera.

18. A method of claim 13, wherein the at least one camera has a focusable camera lens, and the method further comprises adjusting a focal length of the camera lens based upon the position of the at least one reflective element with respect to the at least one camera.

19. A method of claim 13, wherein the light pulses emitted by the at least one illuminator have an infrared wavelength or a near-infrared wavelength.

20. A method of claim 13, wherein the head-mounted display apparatus comprises at least one focus image renderer, at least one context image renderer and at least one optical combiner, the at least one optical combiner comprising at least one first optical element that is substantially transparent for infrared light, the at least one first optical element being positioned on an optical path of the reflections of the light pulses, wherein the method further comprises:
(vii) rendering a focus image at the at least one focus image renderer, wherein an angular width of a projection of the rendered focus image ranges from 5 degrees to 60 degrees;
(viii) rendering a context image at the at least one context image renderer, wherein an angular width of a projection of the rendered context image ranges from 40 degrees to 220 degrees;
(ix) employing the at least one optical combiner to optically combine the projection of the rendered focus image with the projection of the rendered context image to create a visual scene to be presented to the user; and
(x) positioning the at least one reflective element in a manner that the at least one reflective element hides behind a portion of the at least one first optical element upon which the projection of the focus image is incident.

* * * * *